United States Patent
Ganjam et al.

(10) Patent No.: US 9,171,081 B2
(45) Date of Patent: Oct. 27, 2015

(54) ENTITY AUGMENTATION SERVICE FROM LATENT RELATIONAL DATA

(75) Inventors: Kris K. Ganjam, Redmond, WA (US); Kaushik Chakrabarti, Redmond, WA (US); Mohamed A. Yakout, West Lafayette, IN (US); Surajit Chaudhuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/413,179

(22) Filed: Mar. 6, 2012

(65) Prior Publication Data

US 2013/0238621 A1 Sep. 12, 2013

(51) Int. Cl.
G06F 17/30 (2006.01)
G06F 7/00 (2006.01)

(52) U.S. Cl.
CPC .... G06F 17/30864 (2013.01); G06F 17/30539 (2013.01); *G06F 2216/03* (2013.01)

(58) Field of Classification Search
None
See application file for complete search history.

(56) References Cited

U.S. PATENT DOCUMENTS

| | | | |
|---|---|---|---|
| 6,697,818 B2 | 2/2004 | Li et al. | |
| 7,149,746 B2 | 12/2006 | Fagin et al. | |
| 7,877,343 B2* | 1/2011 | Cafarella et al. | 706/20 |
| 7,958,489 B2 | 6/2011 | Meijer et al. | |
| 8,239,751 B1* | 8/2012 | Rochelle et al. | 715/220 |
| 2001/0042080 A1 | 11/2001 | Ross | |
| 2002/0103793 A1 | 8/2002 | Koller et al. | |
| 2003/0033288 A1 | 2/2003 | Shanahan et al. | |
| 2003/0120651 A1* | 6/2003 | Bernstein et al. | 707/6 |
| 2005/0216444 A1 | 9/2005 | Ritter et al. | |
| 2006/0026128 A1* | 2/2006 | Bier | 707/3 |
| 2007/0011183 A1* | 1/2007 | Langseth et al. | 707/101 |
| 2007/0038663 A1* | 2/2007 | Colando | 707/102 |
| 2007/0094285 A1* | 4/2007 | Agichtein et al. | 707/101 |
| 2009/0044095 A1* | 2/2009 | Berger et al. | 715/226 |
| 2009/0222434 A1* | 9/2009 | Fothergill | 707/5 |
| 2011/0071965 A1 | 3/2011 | Long et al. | |
| 2012/0011115 A1* | 1/2012 | Madhavan et al. | 707/723 |
| 2012/0150838 A1* | 6/2012 | Yin et al. | 707/711 |

(Continued)

FOREIGN PATENT DOCUMENTS

WO 0229627 A2 4/2002

OTHER PUBLICATIONS

Yakout et al., InfoGather: Entity Augmentation and Attribute Discovery by Holistic Matching with Web Tables, in Proceedings of the 2012 ACM SIGMOD International Conference on Management of Data (SIGMOD '12). ACM, New York, NY, USA, 97-108.*

(Continued)

*Primary Examiner* — Augustine K Obisesan
*Assistant Examiner* — David T Brooks
(74) *Attorney, Agent, or Firm* — Sandy Swain; Judy Yee; Micky Minhas

(57) ABSTRACT

The subject disclosure is directed towards providing data for augmenting an entity-attribute-related task. Pre-processing is preformed on entity-attribute tables extracted from the web, e.g., to provide indexes that are accessible to find data that completes augmentation tasks. The indexes are based on both direct mappings and indirect mappings between tables. Example augmentation tasks include queries for augmented data based on an attribute name or examples, or finding synonyms for augmentation. An online query is efficiently processed by accessing the indexes to return augmented data related to the task.

21 Claims, 6 Drawing Sheets

(56) References Cited

U.S. PATENT DOCUMENTS

| | | | | |
|---|---|---|---|---|
| 2012/0191642 | A1* | 7/2012 | George | 707/602 |
| 2012/0259890 | A1* | 10/2012 | Denesuk et al. | 707/776 |
| 2013/0166573 | A1* | 6/2013 | Vaitheeswaran et al. | 707/749 |

OTHER PUBLICATIONS

Loser et al., Augmenting Tables by Self-Supervised Web Search, M. Castellanos, U. Dayal, and V. Markl (Eds.): BIRTE 2010, LNBIP 84, pp. 84-99, 2011.*
Gupta et al., Answering Table Augmentation Queries from Unstructured Lists on the Web, VLDB '09, Aug. 24-28, 2009, Lyon, France, 289-300.*
Cafarella et al., Data Integation for the Relational Web, VLDB '09, Aug. 24-28, 2009, Lyon, France, 1090-1101.*
Banko et al., Open Information Extraction from the Web, Commun. ACM 51, 12 (Dec. 2008), 68-74.*
Cafarella et al., WebTables: Exploring the Power of Tables on the Web, PVLDB '08, Aug. 23-28, 2008, AUckland, New Zealand, 538-549.*
Limaye et al., Annotating and Searching Web Tables Using Entities, Types and Relationships, 36th International Conference on Very Large Data Bases, Sep. 13-17, 2010, Singapore. Proceedings of the VLDB Endowment, vol. 3, No. 1, 1338-1347.*
Urbansky et al., Entity Extractions from the Web with WebKnox, V. Snasel et al. (Eds.): Advances in Intelligent Web Mastering—2, AISC 67, pp. 209-218.*
Cheng et al., EntityRank: Searching Entities Directly and Holistically, VLDB '07, Sep. 23-28, 2007, Vienna, Austria, 387-398.*
Yin et al., Facto: A Fact Lookup Engine Based on Web Tables, World Wide Web Conference 2011, Mar. 28-Apr. 1, 2011, Hyderabad, India, 507-516.*
He et al., SEISA: Set Expansion by Iterative Similarity Aggregation,, World Wide Web Conference 2011, Mar. 28-Apr. 1, 2011, Hyderabad, India, 427-436.*
Feldman et al., Self-supervised Relation Extraction from the Web, F. Esposito et al. (Eds.): ISMIS 2006, LNAI 4203, pp. 755-764, 2006.*
Cohen, et al., "Learning to Match and Cluster Large High-Dimensional Data Sets for Data Integration", In Proceedings of the Eighth ACM SIGKDD International Conference on Knowledge Discovery and Data Mining, Jul. 23-26, 2002, 6 pages.
Sarawagi, Sunita, "Models and Indices for Integrating Unstructured Data with a Relational Database", In Proceedings of the Workshop on Knowledge Discovery in Inductive Databases, Sep. 20, 2004, 10 pages.
Schallehn, et al., "Efficient Similarity-based Operations for Data Integration", In Journal of Data & Knowledge Engineering, vol. 48, Issue 3, Aug. 12, 2003, 27 pages.
Berlin, et al., "TupleRank: Ranking Discovered Content in Virtual Databases", In Proceedings of 6th International Conference on Next Generation Information Technologies and Systems, Jul. 4-6, 2006, 15 pages.
Madhavan, et al., Corpus-based Schema Matching, 21st International Conference on Data Engineering, Apr. 5-8, 2005, 12 pages.

Venetis, et al., "Recovering Semantics of Tables on the Web", Proceedings of the VLDB Endowment, vol. 4, Issue 9, Jun. 2011, 10 pages.
Ganjam, et al., "InfoGather: Entity Augmentation and Attribute Discovery by Holistic Matching with Web Tables", SIGMOD '12, May 20-24, 2012, Scottsdale AZ, 12 pages.
Bahman, et al., "Fast Personalized Pagerank on Mapreduce", In SIGMOD, Jun. 12-16, 2011, Athens, Greece, 12 pages.
Ghani, et al., "Text Mining for Product Attribute Extraction", SIGKDD Explorations, vol. 8, Issue 1, Jun. 2006, 8 pages.
Bernstein, et al., Generic Schema Matching, Ten Years Later. In VLDB Endowment, vol. 4, No. 11, 2011, 7 pages.
Cafarella, et al., Data Integration for the Relational Web. VLDB, Aug. 24-28, 2009, Lyon, France, 12 pages.
Cafarella, et al., Webtables: Exploring the Power of Tables on the Web, PVLDB, 2008, 12 pages.
Cafarella, et al., "Uncovering the Relational Web", in WebDB, Jun. 13, 2008, Vancouver, Canada, 6 pages.
Chaudhuri, et al., "Robust and Efficient Fuzzy Match for Online Data Cleaning", In SIGMOD, Jun. 9-12, 2003, San Diego, CA, 12 pages.
Doan, et al., "Reconciling Schemas of Disparate Data Sources: A Machine-Learning Approach", In ACM SIGMOD, May 21-24, 2001, 12 pages.
Elsayed, et al., "Pairwise Document Similarity in Large Collections with Mapreduce", In ACL, Jun. 2008, 4 pages.
Gupta, et al., "Answering Table Augmentation Queries from Unstructured Lists on the Web", Proc. VLDB Endowment, Aug. 24-28, 2009, Lyon France, 12 pages.
Haveliwala, et al., "Topic-Sensitive Pagerank", in WWW 2002, May 7-11, 2002, Honolulu, Hawaii, 10 pages.
He, et al., "Statistical Schema Matching Across Web Query Interfaces", in SIGMOD 2003, Jun. 9-12, 2003, San Diego, CA, 12 pages.
He, et al., "Seisa: Set Expansion by Iterative Similarity Aggregation", In WWW, Mar. 28-Apr. 1, 2011, Hyderabad, India, 10 pages.
Limaye, et al., "Annotating and Searching Web Tables Using Entities, Types and Relationships", VLDB Endowment, vol. 3, No. 1, 2010, 10 pages.
Madhavan, et al., "Generic Schema Matching with Cupid", 27th VLDB Conference, 2001, Roma, Italy, 10 pages.
Page, et al., The Pagerank Citation Ranking: Bringing Order to the Web. Technical Report, Stanford InfoLab, 1998, 17 pages.
Rahm, et al., "A Survey of Approaches to Automatic Schema Matching", The VLDB Journal, 2001, 24 pages.
Yin, et al., "Facto: A Fact Lookup Engine Based on Web Tables", in WWW, Mar. 28-Apr. 1, 2011, Hyderabad, India, 10 pages.
International Search Report and Written Opinion, PCT/US2013/027203 mailed Jun. 26, 2013, 10 pages.
"Office Action Issued in European Patent Application No. 13757813.4", Mailed Date: Mar. 11, 2015, 4 Pages.
"Supplementary Search Report Received for European Patent Application No. 13757813.4", Mailed Date: Mar. 4, 2015, 3 Pages.
Rodriguez, et al., "Determining Semantic Similarity Among Entity Classes From Different Ontologies", In IEEE Transactions on Knowledge and Data Engineering, vol. 15, Issue 2, Mar. 1, 2003, pp. 442-456.

* cited by examiner

ENTITY AUGMENTATION SERVICE FROM LATENT RELATIONAL DATA

BACKGROUND

Information workers (users) frequently work with documents, spreadsheets, databases and so forth containing mentions of various entities. For example, a spreadsheet user may have a list of camera models, or a database user may have a table of companies. The user may want additional information related to an entity or entities.

By way of example, a user may need to fill in additional information in order to complete a task. As a more particular example, to help in making a decision, a user may be tasked with augmenting a spreadsheet containing camera models, by filling in various attributes for each model such as brand, resolution, price and optical zoom. To complete such entity augmenting tasks today, users try to manually find web sources containing the desired information and merge the found corresponding data values with the existing data to assemble a complete set of data.

Other tasks related to augmenting data often come up as well. Thus in general, users may benefit from an automated solution that assists users in performing such tasks. However, existing approaches are generally unsatisfactory with respect to their level of data precision (the augmented data is often wrong) and recall (the augmented data is often unable to be found, e.g., due to poor coverage). It is thus desirable to provide an automated solution to these and other such tasks that assists users to a reasonably desirable extent.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an augmentation task is processed based upon direct and indirect relationships between entities and attributes mined from at least one corpus. The relationship-based data, processed into an index, is accessed to find data that completes the augmentation task.

Example augmentation tasks include queries for augmented data, such as one in which the query identifies an entity set (or more entities) and an attribute name, and where using the relationship-based data to complete the augmentation task comprises looking up at least one attribute value for each entity of the entity set, and/or one in which the query identifies an entity set and one or more attribute value examples, and wherein using the relationship-based data to complete the augmentation task comprises looking up at least one attribute value for at least one entity of the entity set based on the one or more attribute examples. Another task queries for synonym data, in which the query identifies an entity name, and wherein the relationship-based data is looked up to find at least one synonym for the attribute name.

In one aspect, a service is configured to process domain-independent entity augmentation tasks, including to preprocess relational tables obtained from at least one corpus into a plurality of indexes. The indexes include data based upon indirect mappings between at least some of the tables. The service responds to a query corresponding to an entity augmentation task with data obtained via the indexes, including to identify seed tables via the index, compute scores for each seed table, compute a preference vector based upon vectors of the seed tables, compute prediction scores based upon the preference vectors and vectors associated with at least some of the relational tables, aggregate the scores, and return a final prediction based upon aggregation of the scores to complete an entity augmentation task to respond to the query.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an automatic entity augmentation service having relatively high precision and coverage/recall with respect to augmented data, as well as fast (e.g., interactive) response times. The entity augmentation technology may be applicable to any arbitrary domain of entities.

In general, the service is based upon data collected from a very large amount of data sources, e.g., a web table corpus. For example there are on the order of hundreds of millions of such entity-attribute tables (also referred to as relational tables and two-dimensional tables) that may be crawled from the web. Described herein are a holistic matching framework that may be based on topic sensitive page ranking, and an augmentation framework that aggregates predictions from multiple matched tables, including indirectly matching tables in addition to directly matching tables. This makes the predictions more robust to spuriously matched tables.

It should be understood that any of the examples herein are non-limiting. For example, while relational tables in the form of entity-attribute tables are described, other data structures and even unstructured data may be processed into augmentation-related data. Further, while the web is one source of such data, other sources such as enterprise databases, subject matter-centric corpuses (e.g., medical-related sources, financial-related sources, and so on) may be accessed to obtain entity-related data.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and entity augmentation in general.

Figure 1:
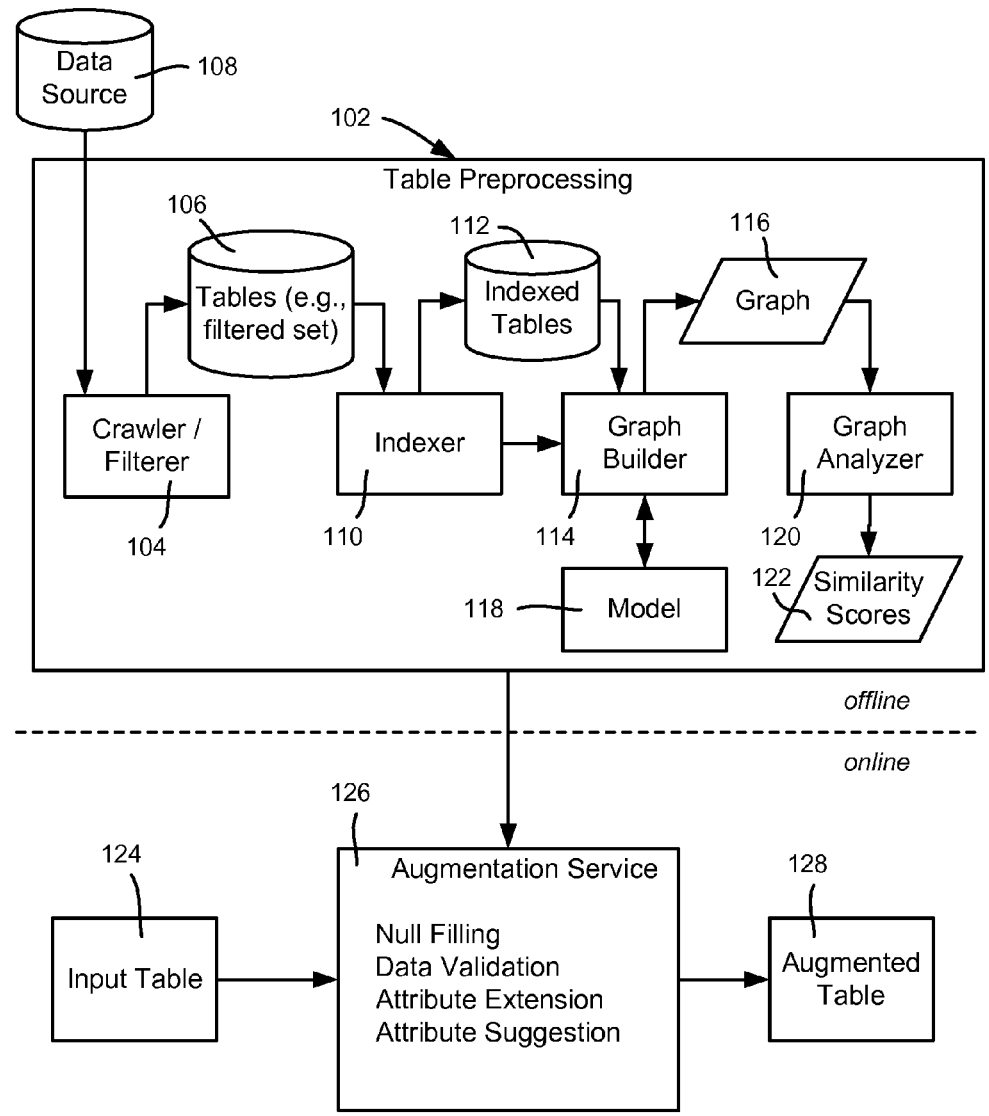
FIG. 1 is a block diagram representing example components of an entity attribute augmentation service according to one example implementation.

FIG. 1 is a block diagram showing various components in one example implementation. In general, a table pre-processing stage 102, which may be performed offline, includes a crawler 104 that extracts relational tables 106 from a data source 108, e.g., web pages and/or a data market. For web pages, the crawler 104 may classify whether the HTML and/or textual data is indeed a table and not simply used for formatting or layout of the page. Various techniques may be used to filter out formatting tables and other tables that do not appear to be relational in nature, and thus FIG. 1 shows a crawler/filterer. Due to the vast quantity of web pages, a map-reduce computing architecture may be used to extract tables in parallel across a large number of computational nodes.

An indexer 110 inputs the tables 106 produced by the crawler 104 and indexes them (indexed tables 112) to enable quick identification of those web tables that are similar to a given query table. The indexer 110 returns the web tables that have sufficient record overlap with query table records. This overlap may allow fuzzy matching to allow different value representations, e.g., "Microsft Corp" in the query record (intentionally misspelled herein to represent actual user errors) may be considered a match with "Microsoft Corporation" in a particular web table.

A graph builder 114 generates a graph 116, in which the vertices of the graph 116 correspond to each web table and the edges are weighted to correspond to the similarity of the two tables. In one example implementation, table similarity is computed using a feature-based measure that incorporates many features of the two tables including, degree of record overlap, column name similarity, similarity of the surrounding web page contexts in which the tables occurred, URL similarity, pre-computed static PageRank values for the document and the domain of the website, and bag of words similarity between the sets of the words in each table. This measure may be computed using a model 118 trained over tables that are already known to be highly similar. Note that the model training data collection process can be performed to an extent without user-labeled data by finding bridge tables that have high overlap with two other tables, and using these other two tables as a positive training example.

A graph analyzer 120 processes the table graph 116 and generates a similarity score 122 between each pair of web tables. One approach propagates similarity between tables to compute a personalized page rank (PPR) of the other tables for each web table, e.g., structured as a matrix. In general, this approach propagates the local pair-wise similarity between tables and allows two tables which have many neighbors in common, but are not directly linked, to have a higher similarity. This property is useful in the context of data augmentation, as the complete query records may not have direct overlap with the tables necessary to augment the query records which are incomplete.

Figure 2:
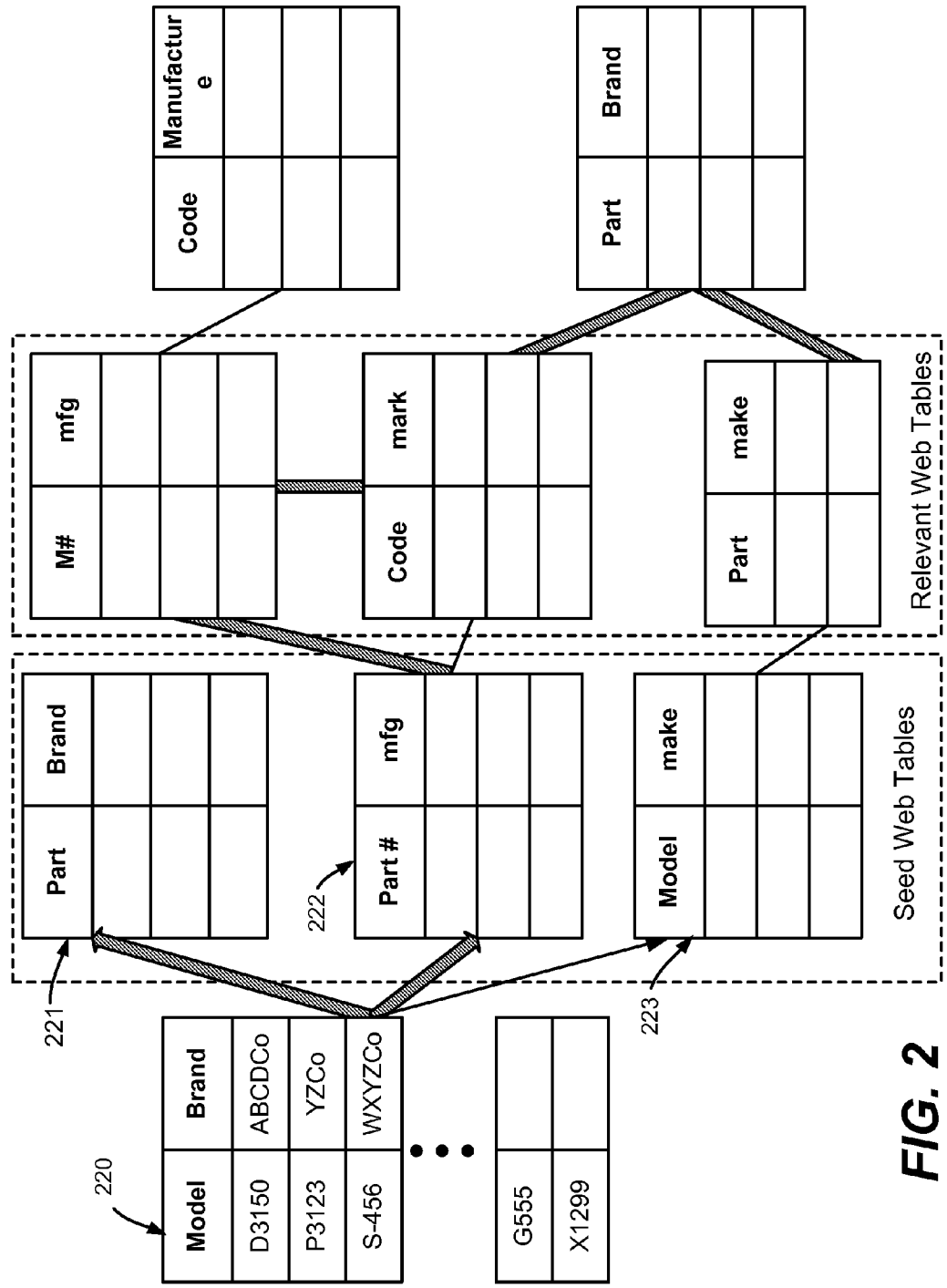
FIG. 2 is a block diagram representing mappings between an example query table, seed tables and relevant web tables used in entity attribute augmentation according to one example implementation.

By way of example, FIG. 2 exemplifies a holistic approach in which relationships to a query table 220 are propagated to obtain desirable predictions and coverage. The holistic approach allows tables that share no direct overlap or other direct relationship with the query table to contribute to the augmentation task. In one implementation, the augmentation service utilizes the PPR matrix produced by the graph analyzer 120. The service 126 receives augmentation task requests from clients (e.g., via an API set or the like), performs the entity augmentation processing to complete the task and returns the augmented results.

In one aspect, null filling is performed as one task, in which the input is a table of entity names that may have missing attribute values. One step finds the web tables that have complete records in common with the input table, which are referred to herein as the "seed" tables. FIG. 2 shows example seed tables 221-223. A similarity strength between the input table 220 and each seed table 221-223 is computed and forms a vector. The PPR matrix is multiplied by this vector to produce a final vector which contains the score of each web table for the given input table. The web tables are then used to predict a missing attribute value by taking the attribute value associated with each web table record matching the non-missing input attribute values, and aggregating the web table rank to arrive at a final probability for each value. The highest ranked value, optionally above a user-specified threshold, is used to fill in the null.

If the input or web tables contain more than two columns, the process may attempt to identify a key-like column and then split the table into several two-column tables.

Other possible augmentation tasks include augmentation by attribute name, which is similar to null filling except that the attribute name is provided with the table. In augmentation by attribute name, the target attribute values are treated as null and the user supplies a target attribute name. The web tables are ranked with respect to the input table, utilizing the same process as for null filling. The seed tables have overlap with the input table and match with the target attribute name. The prediction process is the same as for null filling.

Another task is data validation, which is also similar to null filling except that a validation warning is raised if the top predicted value does not match the actual value in a given input record. Another possible augmentation task is attribute extension by values (augmentation by example) which fills in null values for the target attribute based upon a few seed example values provided with the table.

Attribute suggestion is another task, which takes an input table and suggests the top K most interesting attributes by which the table may be extended. The process works similarly to attribute extension by name, by first ranking the web tables with respect to the key column of the input table. The highly-ranked web tables are clustered into approximate cliques by utilizing the PPR matrix. Each cluster contains web tables which are mutually similar to each other. Because in one implementation each web table has been converted into one or more two-column tables, the most frequent non-input-matching column name may be taken from each table cluster to derive a name for the cluster. The clusters are ranked and the top K cluster names are returned to the user.

Consider a user researching for products or stocks or an analyst performing competitor analysis. One of the most labor-intensive subtasks of such tasks is gathering information about the entities of interest. Two such subtasks include finding the values of attributes of one or more entities, and finding the relevant attributes of an entity type. These subtasks are automated based upon the extracted web tables. In one implementation, these subtasks may use the operations described herein, namely augmentation by attribute name, augmentation by example, and attribute discovery. Other operations may be provided.

Figure 3A:
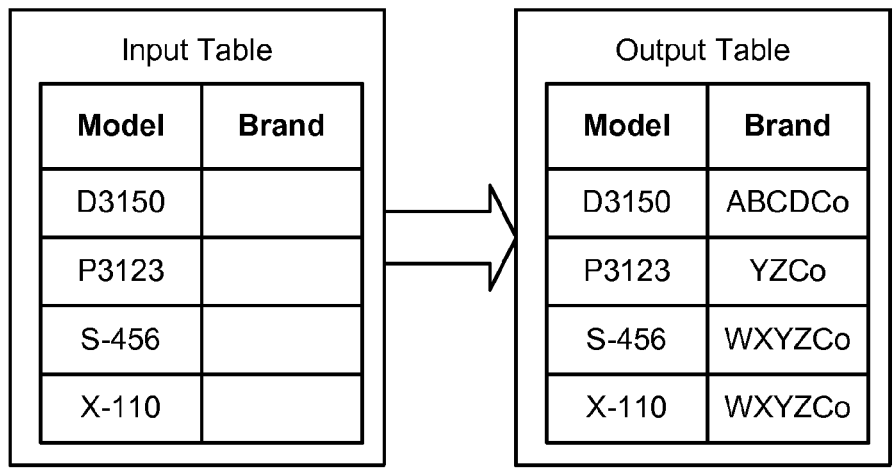
FIGS. 3A-3C comprise representations of entity attribute augmentation tasks completed by an entity attribute augmentation service according to one example implementation.

Augmentation by attribute name automates the example task set forth above, e.g., given a camera model, find values on various attributes such as brand, resolution, price and optical zoom, with the values/attributes referred to herein as augmenting attributes. FIG. 3A shows example input and output for this operation applied to some example model entities with one augmenting attribute (brand).

Figure 3B:
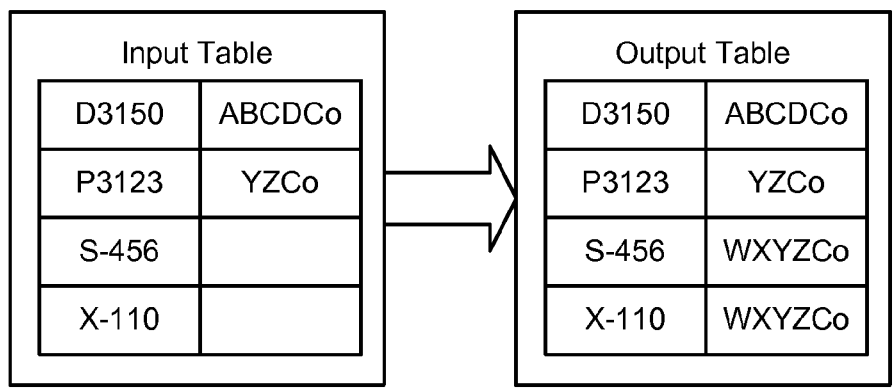

FIG. 3B exemplifies augmentation by example, which provides values on one or more augmenting attribute for missing entities instead of providing the name of the augmenting attribute or attributes. As can be seen, the entity-attribute relationship is determined from known examples provided, which facilitates locating missing attribute values.

Figure 3C:
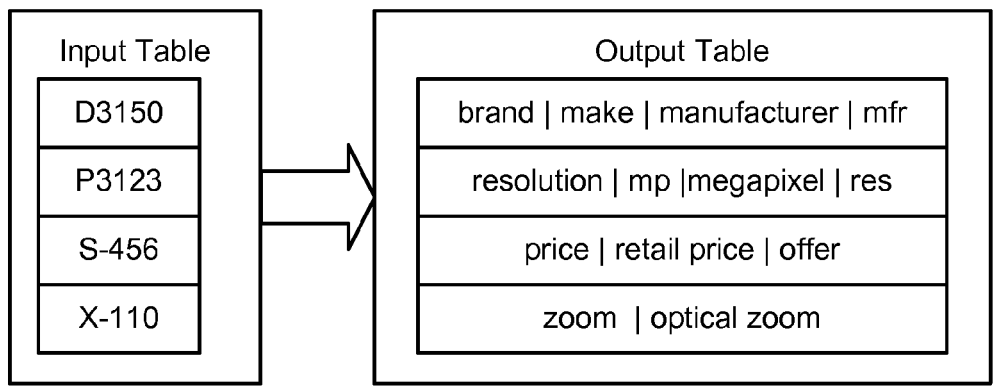

Attribute discovery is exemplified in FIG. 3C. Consider that a user may not know enough about an entity domain; in such cases, the user wants to know the most relevant attributes for a given set of entities, e.g., to select certain desired ones and request augmentation values for those selected. By using the service that determines relevant attributes automatically, the user saves time and effort in trying to discover them manually.

To provide a more useful service, high precision and high coverage are desired, with respect to the entities correctly augmented, the number of entities augmented and the number of entities, respectively. A desirable service further provides fast (e.g., interactive) response times and applies to entities of any arbitrary domain.

For simplicity, only one augmenting attribute is considered in the examples, with suitable extensions being straightforward. As shown in FIG. 3A, the input may be viewed as a binary relation, with the first column corresponding to the entity name and the second corresponding to the augmenting attribute. The first column is populated with the names of entities to be augmented while the second column is empty. This table may be referred to herein as the query table (or simply the query). A baseline technique identifies web tables that semantically matches with the query table using schema matching techniques, e.g., using one-to-one mappings. Each entity is looked up in the web tables to obtain its value on the augmenting attribute.

Figure 4:
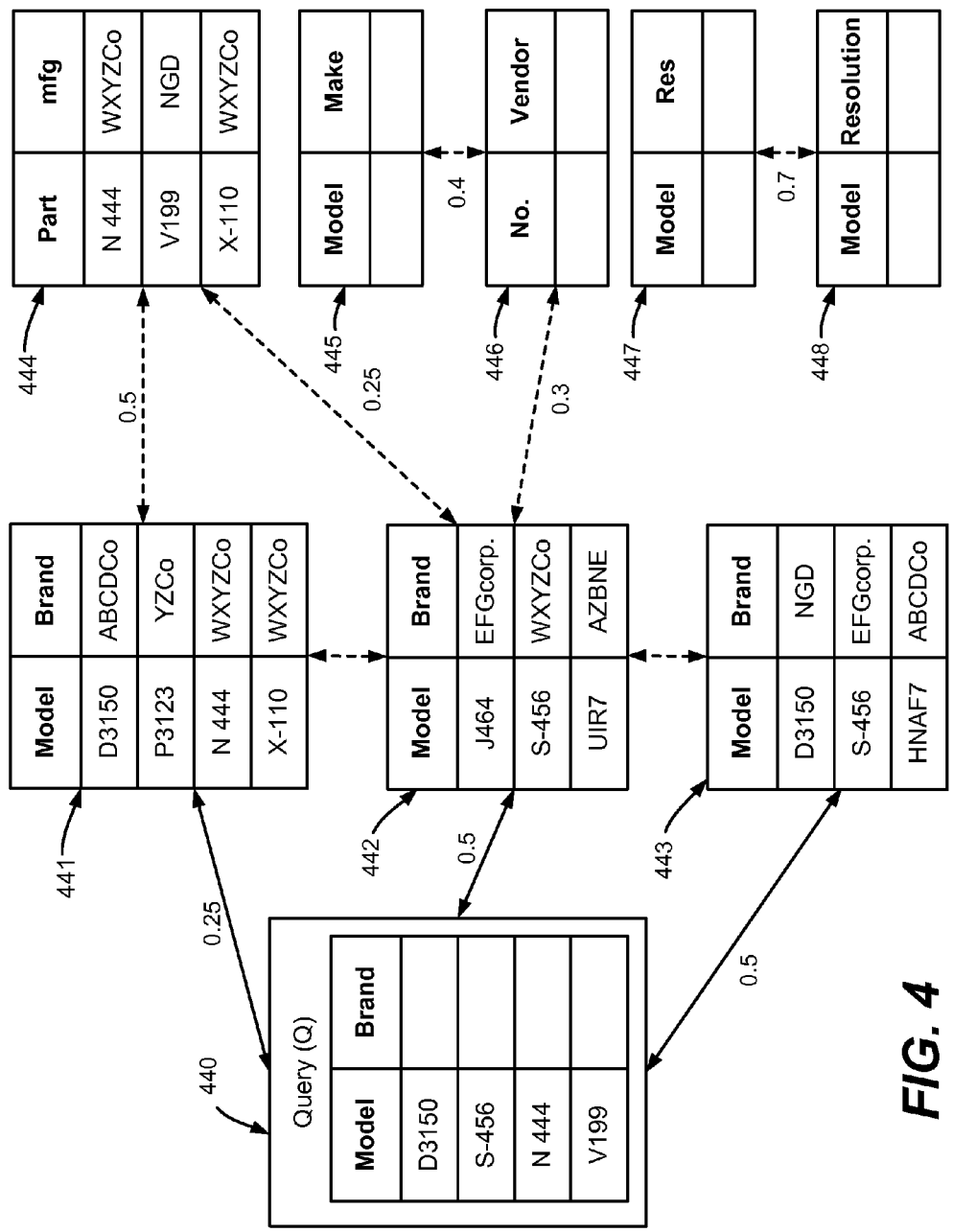
FIG. 4 is a representation of an example query table and direct and indirect mappings between tables used in entity attribute augmentation according to one example implementation.

Consider a query table Q (an example one is labeled 440 in FIG. 4). For simplicity in this example, consider that like the query table, the web tables are similarly two column entity-attribute binary relations, with the first column corresponding to the entity name and the second to an attribute of the entity. Using traditional schema matching techniques, a web tables matches a query table Q if the data values in the first column overlaps with those in the first column of a query table Q and the name of the second column is identical to that of the augmenting attribute. Such matches are referred to herein as "direct matches" and the approach as "direct match approach."

In FIG. 4, only the web tables 441-443 directly match with the query table 440 (shown using solid arrows). A score can be associated with each direct match based on the degree of value overlap and degree of column name match; example scores are shown in FIG. 4 by the values adjacent the arrows. If only direct match is used, the entities in the web tables 441-443 are simply looked up; for the model "D3150" both web tables 441 and 443 contain it, however the values are different ("ABCDCo" and "NGD" respectively). A value may be chosen arbitrarily or from the web table with the higher score, i.e., "NGD" from the web table 443. For model "S-456," "WXYZCo" or "EFGcorp" may be chosen, as they have equal scores. For "N 444" there is only "WXYZCo." The lookup is unable to augment V199 as none of the matched tables contain that entity.

As can be readily appreciated, direct match only often suffers from low precision; consider for example that the table 443 may contain cell phone models and brands, instead of a desired entity such as cameras. The names of some of the cell phone models in the table 443 are identical to those of the camera models in the query table 440, whereby the table 443 gets a high score. This results in at least one, and possibly two (out of three) wrong augmentations (two of three if choosing from the table 443 when resolving the conflict). Such ambiguity of entity names exists in virtually all domains, and while this can mitigated by raising the matching threshold, doing so leads to poor coverage.

Another problem with the direct match only technique is low coverage; in the above example, the process failed to augment V199, and the coverage is thus seventy-five percent. Note that this number is much lower in practice, especially for tail domains, and tends to occur because tables that can provide the desired values either do not have column names or use the same column name as the augmenting attribute name provided by the user. Synonyms of the augmenting attribute may help, but are manually generated (automatic generation results in poor quality), which is not feasible where entities may be from any arbitrary domain.

Described herein is the further use of tables that indirectly match the query table, e.g., via other web tables. Using such indirectly matching tables, in conjunction with directly matching ones, generally improves both coverage and precision. By way of example of improved coverage, in FIG. 4, the table 444 contains the desired attribute value of V199 (NGD) but it is not reached using direct match only. Using schema matching techniques, the table 444 matches with the table 441 (i.e., there is one-to-one mapping between the two attributes of the two relations) as well as the table 442 (as it has two records in common with the table 442 and one in common with the table 442). Such schema matches among web tables are denoted by dashed arrows; each such match has a score representing the degree of match. Because the table 441 and/or the table 442 (approximately) matches with the query table 440 (using direct matching) and the table 444 (approximately) matches with the table 441 and the table 442 (using schema matching), it may be concluded that the table 444 (approximately) matches with the query table 440. The table 444 is referred to herein as an indirectly matching table; using it, V199 may be correctly augmented. In this example, coverage is improved to one-hundred percent via indirect matching.

Notwithstanding, many indirectly matching tables contain spurious matches, whereby using such tables to predict values results in wrong predictions. To be robust to such spurious matches, described herein is the use of holistic matching, based upon the observation that truly matching tables match with each other and with the directly matching tables, either directly or indirectly, while spurious ones do not. For example, the tables 441, 442 and 444 match directly with each other while the table 444 only matches weakly with the table 442. If, for example, the overall matching score of a table is computed by aggregating the direct match as well as the indirect matches, the true matching tables receive higher scores, which is the basis for holistic matching as described herein. In the example of FIG. 4, the tables 441, 442 and 444 get higher scores compared with the table 443; this leads to correct augmentations by not using the table 443, resulting in a precision of one-hundred percent. Further, for each entity, predictions may be obtained from multiple matched tables and aggregated, whereby the "top" one (or k) value(s) may be selected as the final predicted value(s).

Note that in practice, this results in technical challenges, e.g., computing schema matches between pairs of web tables (the schema matching among web tables, or SMW graph) using 573M×573M pairs of tables needs to be accurate. Further, the holistic matching needs to be modeled such that the model takes into account the scores associated with the edges in the SMW graph as well as those associated with the direct matches. Still further, the entities need to be augmented efficiently at query time.

To this end, there is provided a holistic matching framework based on topic sensitive pagerank (TSP) over the graph.

Also provided is a system architecture that leverages preprocessing (e.g., in MapReduce technology) to achieve extremely fast (interactive) response times at query time.

In one implementation, a machine learning-based technique is used for building the SMW graph, based upon the use of features (e.g., including text) associated with the web tables to determine whether two web tables match or not. Further, training data for this learning task may be automatically generated as described herein, although manually produced labeled data may be used instead of or in addition to automatically produced labeled data.

Turning to an example holistic matching framework and data model, for purposes of simplicity, assume that the query table is an entity-attribute binary relation, e.g., a query table Q is of the form Q(K,A), where K represents the entity name attribute (also referred to herein as the query table "key") and A is the augmenting attribute. The key column is populated while the attribute column is empty, as shown in the example query table 440 of FIG. 4. Further, assume that the web tables are entity-attribute binary relations as well, as in the web tables 441-444 of FIG. 4.

For each web table $T \in \mathcal{T}$, the relation is $T_R(K,B)$ where K denotes the entity name attribute (referred to herein as the web table key attribute) and B is an attribute of the entity, the URL $T_U$ of the web page from which it was extracted, and its context $T_C$ (e.g., the text surrounding the table) in the web page from which it was extracted. For simplicity, $T_R(K,B)$ may be denoted as T(K,B) when clear from the context.

For augmentation by attribute name, given a query table Q(K,A) and a set of web tables $\langle T(A, B), T_U, T_C \in \mathcal{T}$, the operation is to predict the value of each query record $q \in Q$ on attribute A. Note that not all web tables are in the form of entity-attribute binary relations, however the framework described herein may be used for general, n-ary web tables. Further, the query table can have more than one augmenting attribute; in one implementation the attributes are considered independent and predictions may be performed for one attribute at a time.

In one implementation, a general augmentation framework identifies web tables that "match" with the query table, and uses each matched web table to provide value predictions for the particular keys that happen to overlap between the query and the web table. To identify matching tables, in general, a web table T(K,B) matches the query table Q(K,A) if Q.K and T.K refer to the same type of entities and Q.A and Q.B refers to the same attribute of the entities; (for purposes of simplicity, one-to-one mappings are described). Each web table is assigned a score S(Q,T) representing the matching score to the query table Q; because Q is fixed, the notation may be denoted as S(T). There are various ways to obtain matching scores between a query table and web tables; examples are described below.

To predict values, for each record $q \in Q$, the value q[Q.A] of record q on attribute Q.A from the matching web tables is predicted by joining the query table Q(K,A) with each matched web table T(K,B) on the key attribute K. If there exists a record $t \in T$ such that $q[Q.K] \approx t[T.K]$ (where denotes either exact or approximately equality of values), then the web table T predicted the value v=t[T.B] for q[Q.A] with a prediction score $S_T(v)=S(T)$ and $(v, S_T(v))$ is returned. After processing the matched tables, there is a set $P_q=\{(x_1, S_{T1}(x_1)), (x_2, S_{T2}(x_2)), \ldots\}$ of predicted values for q[Q.A] along with their corresponding prediction scores. For each distinct predicted value $v \in P_q$, the final prediction score is computed by aggregating the predictions scores obtained for v:

$$S(v) = \mathcal{F}_{(x_i, S_{T_i}(x_i)) \in P_q | x_i \approx v} S_{T_i}(x_i) \qquad (1)$$

where $\mathcal{F}$ is an aggregation function. Alternative aggregation functions such as sum, max or max_top_d may be used in this framework. The final predicted value for q[Q.A] is the one with the highest final prediction score:

$$q[Q.A] = \underset{v}{\operatorname{argmax}} S(v) \qquad (2)$$

In an implementation that augments k values for an entity (e.g., the entity is a musician and the desire is to augment the musician name with his or her albums), the k highest final prediction scores are selected. Thus, in the example of FIG. 4, using the table matching scores shown, for the query record D3150, $P_q = \{(ABCDCo, 0:25), (NGD, 0:5)\}$ (predicted by tables 441 and 443 respectively). Thus, the final predicted values are ABCDCo and NGD with scores 0:25 and 0:5 respectively, so the predicted value is NGD.

One way to compute matches is the direct match approach as described above, e.g., using traditional schema matching techniques, direct matching considers a web table T to match with the query table Q if and only if data values in T.K overlap with those in Q.K and T.B≈Q.A. Direct matching computes the matching score $S_{DMA}(T)$ between Q and T as:

$$S_{DMA}(T) = \begin{cases} \dfrac{|T \cap_K Q|}{\min(|Q|, |T|)} & \text{if } Q.A \approx T.B \\ 0 & \text{otherwise.} \end{cases} \qquad (3)$$

where $|T \cap_K Q| = |\{t | t \in T \ \& \ \exists q \in Q \ \text{s.t.} T[T.K] \approx q[Q.K]\}|$. For example, in FIG. 4, the scores for the tables 441, 442 and 443 are 1/4, 2/4 and 2/4, respectively as they have one, two and two matching keys respectively, min(|Q|, |T|)=4 and Q.A≈T.B; the score for the table 444 is zero because Q.A does not approximately equal T.B. The prediction step is identical to that in the general augmentation framework, described above.

Turning to a holistic match approach, consider a weighted, directed graph G(V,E), with the weight on an edge denoted as $(u, v) \in E$ with $\alpha_{u,v}$. Pagerank is the stationary distribution of a random walk on G that at each step, with a probability $\epsilon$, usually called the teleport probability, jumps to a random node, and with probability $(1-\epsilon)$ follows a random outgoing edge from the current node. Personalized Pagerank (PPR) is the same as Pagerank, except that the random jumps are done back to the same node, denoted as the "source" node, for which the Pagerank is being personalized. Formally, the PPR of a node v, with respect to the source node u, denoted by $\Pi_u(v)$, is defined as the solution of the following equation:

$$\pi_u(v) = \epsilon \delta_u(v) + (1-\epsilon) \sum_{\{w|(w,v) \in E\}} \pi_u(w) \alpha_{w,v} \qquad (4)$$

where $\delta_u(v)=1$ if and only if u=v, and 0 otherwise. The PPR values $\Pi_u(v)$ of the nodes $v \in V$ with respect to u is referred to herein as the PPR vector of u. A "topic" is defined as a preference vector $\vec{B}$ inducing a probability distribution over V; the value of $\vec{B}$ for node v∈V is denoted as $B_v$. Topic sensitive pagerank (TSP) is the same as Pagerank, except that the random jumps are done back to one of the nodes u with $B_u>0$, chosen with probability $B_u$. Formally, the TSP of a node v for a topic $\vec{B}$ is defined as the solution of the following equation:

$$\pi_{\vec{\beta}}(v) = \epsilon\vec{\beta} + (1-\epsilon) \sum_{\{w|(w,v)\in E\}} \pi_{\vec{\beta}}(w)\alpha_{w,v} \quad (5)$$

With respect to modeling holistic matching using TSP, a connection is drawn between holistic match between two web tables and the PPR of a node with respect to a source node. Given a the set of web tables, the weighted SMW graph G(V,E) is built, where each node v∈V corresponds to a web table and each edge (u, v)∈E represents a semantic match relationship between the web tables corresponding to u and v. Each edge (u, v)∈E has a weight $\alpha_{u,v}$ that represents to the degree of match between the web tables u and v (provided by the schema matching technique).

Consider two nodes u and v of any weighted, directed graph G(V,E). The PPR $\Pi_u(v)$ of a v with respect to u represent the holistic relationship of v to u where E represents the direct, pairwise relationships, e.g., it considers all the paths, direct as well as indirect, from u to v and aggregates their scores to compute the overall score. When the direct, pairwise relationships are hyperlinks between web pages, $\Pi_u(v)$ s the holistic importance conferral (via hyperlinking) of v from u. Alternatively, when the direct, pairwise relationships are direct friendships in a social network, $\Pi_u(v)$ is the holistic friendship of v from u. Described herein is applying such technology to the SMW graph. Here E represents the direct, pairwise semantic match relationship, e.g., PPR of $\Pi_u(v)$ of a v with respect to u over the SMW graph models the holistic semantic match of v to u. If u was the query table, $S_{Hol}(T) = \Pi_u(v)$ where v corresponds to T. Note that the query table Q is typically not identical to a web table; however, by considering Q as a "topic" and model, the match as the TSP of the node v corresponding to T corresponds to the topic. In the web context where the relationship is that of important conferral, the most significant pages on a topic are used to model the topic (e.g., the ones included under that topic in Open Directory Project); in this context where the relationship is semantic match, the top matching tables are used to model the topic of Q. The set of web tables S (referred to herein as seed tables) that directly match with Q are used to model it, i.e., $S=\{T|S_{DMA}(T)>0\}$. Furthermore, the direct matching scores $S_{DMA}(T)|T\in S$ may be used as the preference values $\vec{B}$:

$$\beta_v = \begin{cases} \frac{S_{DMA}(T)}{\Sigma_{T\in S}S_{DMA}(T)} & \text{if } T \in S \\ 0 & \text{otherwise,} \end{cases} \quad (6)$$

where v corresponds to T. For example, $B_v$ are $$\frac{0.25}{1.25}, \frac{0.5}{1.25} \text{ and } \frac{0.5}{1.25}$$

for the tables 441, 442 and 443 respectively and zero for all other tables. As the TSP score of web page represents the holistically computed importance of a page to the topic, $\Pi_{\vec{B}}(v)$ of v with respect to the above topic $\vec{B}$ over the SMW graph models the holistic semantic match of v to Q. Thus, $S_{Hol}(T) = \Pi_{\vec{B}}(v)$ may be used where v corresponds to T.

Consider that the SMW graph has been built upfront. One way to compute the holistic matching score $S_{Hol}(T)$ for each web table is to run the TSP computation algorithm over G at augmentation time, however this results in prohibitively high response times. Instead, by pre-computing the PPR of every node with respect to every other node (referred to herein as Full Personalize Pagerank (FPPR) computation) in the SMW graph, the holistic matching score may be computed for any query table efficiently, which leads to very fast response times at query time.

Figure 5:
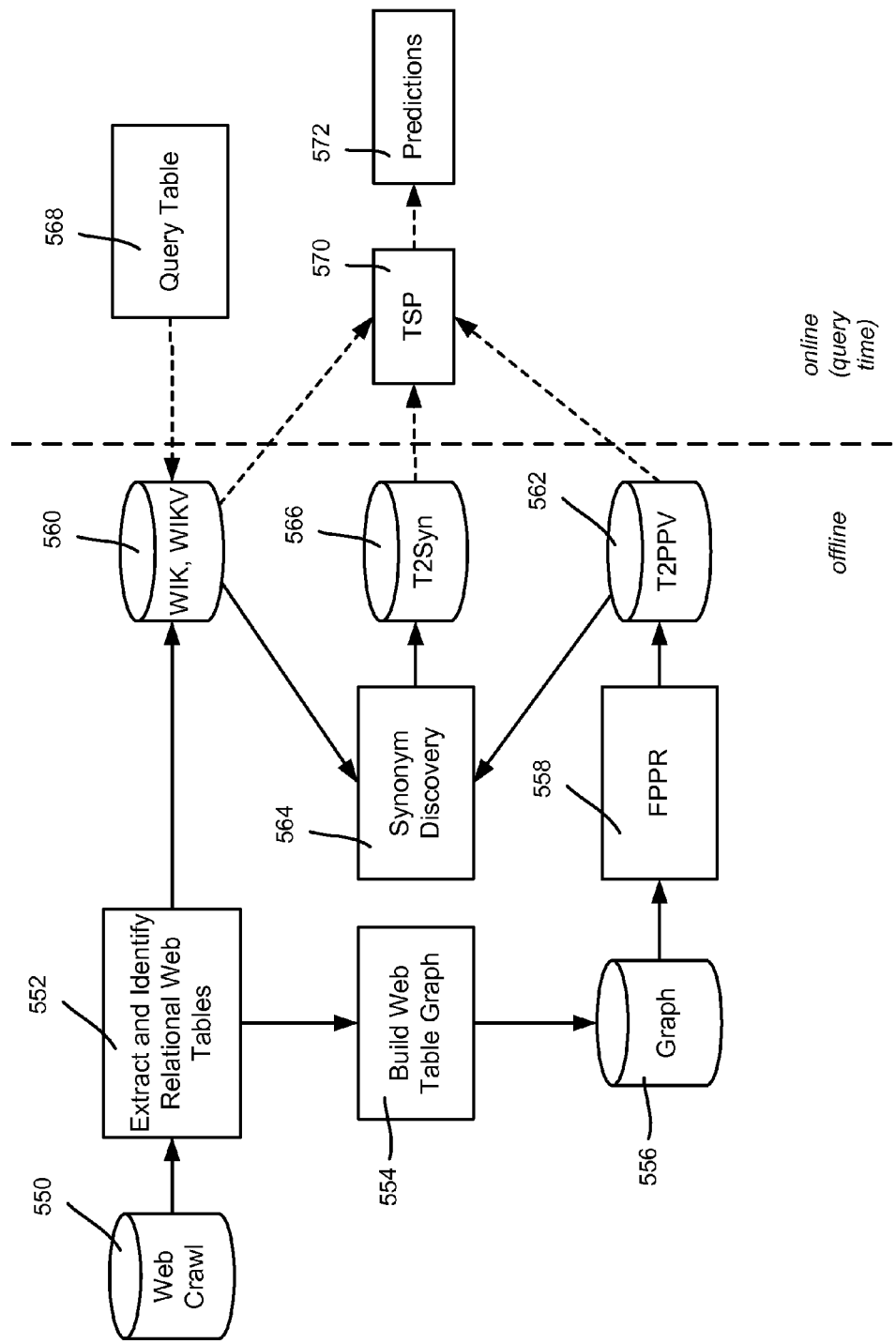
FIG. 5 is a block/flow diagram showing example offline and online components to provide an entity attribute augmentation service according to one example implementation.

FIG. 5 provides additional details of an architecture similar to that described with reference to FIG. 1, in the form of a block and flow diagram. Offline preprocessing may include the web crawl 550 to extract the web tables 552, build the SMW graph (blocks 554 and 556) and compute the FPPR 558 (Full Personalized Pagerank) for each web table, e.g., scaling to on the order of hundreds of millions of tables; the MapReduce framework may be used for this purpose. As described above, the offline part extracts the web tables from the web crawl and uses a classifier to distinguish the relational web tables from the other types of web tables, (e.g., formatting tables, entity attribute tables, and so forth) based on known techniques. Further, the web tables are indexed to facilitate faster access to the tables. One implementation uses two indexes (block 560), including an index on the web tables' key attribute (WIK). Given a query table Q, WIK(Q) returns the set of web tables that overlaps with Q on at least one of the keys. The second comprises an index for the web tables complete records (that is key and value combined) (WIKV). WIKV(Q) returns the set of web tables that contain at least one record from Q.

The offline part further builds the SMW graph based on schema matching techniques as described herein, computes the FPPR and stores the PPR vector for each web table (storing only the non-zero entries in one implementation), referred to herein as the T2PPV index 562. For any web table T, T2PPV(T) returns the PPR vector of T, as also described herein. Block 560 represents discovering the synonyms of attribute B for each web table T(K,B), which is also described below along with the attribute discovery operation, and is referred to herein as the T2Syn index 566. For any web table T, T2Syn(T) returns the synonyms of attribute B of table T. The indexes (WIK, WIKV, T2PPV and T2Syn) may either be disk-resident or reside in memory for faster access, for example.

Given a query table 568, the online query time processing part computes the TSP scores 570 for the web tables and aggregates the predictions 572 from the web tables. Query time processing can be abstracted in various example operations. One operational step identifies the seed tables by leveraging the WIK and WIKV indexes (block 560) to identify the seed tables and compute their direct matching scores. Another operational step computes the TSP scores 570, e.g., the preference vector is computed by plugging in the direct matching scores in Equation (6), using the preference vector and the stored PPR vectors of each table to compute the TSP score for each web table. Note that only the seed tables have nonzero entries in the vector, and thus the PPR vectors of only the seed tables using the T2PPV index need to be retrieved. Note that there is no need to compute TSP scores for all web tables, but only for the tables that may be used in the aggregation step, e.g., the ones that have at least one key overlapping with the query table, referred to herein as relevant tables; these can be efficiently identified by invoking WIK(Q).

Another operational step aggregates and selects values, by collecting the predictions provided by the relevant web tables T along with the scores $S_{Hol}(T)$. The predictions 572 are processed, the scores are aggregated and the final predictions are selected according to the operation.

Turning to building the SMW graph and computing the FPPR, described is matching a pair of web tables along with scalability challenges. In the SMWgraph, there is an edge between a pair of web tables (T(K,B)), (T'(K',B')) if T matches with T', i.e., T.K and T.K' refer to the same type of entities and T.B and T'.B' refers to the same attribute of those entities. Schema matching may be used to determine whether T matches with T' and the score of the mapping, but only to an extent, e.g., tables of cameras and cell phones may be matches with schema matching, and indirect matches are not found.

Described herein is the context (e.g., the text) associated with the web table in the web page, which tends to provide valuable information about the table. For example, if the context for the table 443 is "mobile phones or cell phones, ranging from . . . " or "Phones that are compatible with . . . " information regarding the table is obtainable. Similarly, for the tables 442 and 444, the text may include "Ready made correction data for cameras and lenses" and "Camera Bags Compatibility List," respectively, which indicates that tables 442 and 444 are more likely about cameras while the table 443 is about phones.

Described herein is capturing context-based concepts via context similarity features, which may be computed using the tf-idf cosine similarity of the text around the table, (based upon IR retrieval). The context of a table may contain keywords that overlap with values inside another web table. This provides evidence that the web pages containing the tables are likely about similar subjects, and hence, that the tables may be about similar subjects as well. A table-to-context similarity feature may be computed using the tf-idf cosine similarity of the text around the first table and the text inside the second table.

Further, the URL of the web page containing the table may help in matching with another table. For example, sometimes a web site lists the records from the same original large table in several web pages, e.g., a web site may list the movies in several web pages by year, by first letter, and so forth. In this event, matching the URLs of the web pages is a good signal in the matching of the web tables. A URL similarity feature, e.g., computed using cosine similarity of the URL terms, may be used, and so on.

The above similarities (as well as possibly many other features) may be used as features in a classification model. Example features include:

| Feature name | Description/Document |
|---|---|
| Context | Terms in the text around the web table with idf weights. |
| Table-to-Context | The table content as text and context text with idf weights. |
| URL | The terms in the URL with idf weight computed from the URL set. |
| Attributes name | The terms mentioned in the column names with equal weights. |
| Column values | The distinct values in a column form a document with equal .weights. |
| Table-to-Table | The table content as text with idf weights weight on the edge between them (similarity as a bag of words). |
| Column widths | Similarity in columns widths. |

Given the features, the model predicts the match between two tables with a probability, which is used as the weights on the edge between them. Note that these features may be computed for a very large number of web tables (hundreds of millions) squared, which may be too computationally expensive. However, for each of the example features in one implementation, the web table may be considered as a bag of words (or document). Scalable techniques for computing pairwise document similarities over a large document collection may then be leveraged. Known techniques to compute a document similarity matrix of a large document set, e.g., using MapReduce may be used, e.g., each document d contains a set of terms and can be represented as a vector $W_d$ of term weights $M_{t,d}$. The similarity between two documents is the inner product of the term weights; a term twill contribute to the similarity of two documents if present in both documents. With an inverted index I, it is straightforward to obtain the documents I(t) that contain a particular term t. By processing the terms the entire similarity matrix is computed.

This can be implemented directly as MapReduce tasks, including indexing, in which a mapper processes each document and emits for each term, and a reducer that outputs the term as the key and the list of documents containing that key. Another task is similarity computation, in which the mapper processes each term with its list of document and emits for each pair of documents a similarity score. The reducer performs a summation to output the scores. For more efficiency, a df-cut notion may be used to eliminate terms with high document frequency.

As described above, labeled examples to train the classifier may be automatically obtained. To label a pair of web tables (T, T') as a positive example, even if T and T' do not have records in common, a third web table T" may contain some records in common with T and T' individually (referred to herein as a labeling web table). For example, consider the tables 442 and 444 in FIG. 4. The table 441 his found to be the labeling web table for them; the table 441 overlaps with 442 as well as with the table 444. If such labeling web table is not found, then the features vector is considered as a negative example.

Once the SMW graph is constructed, the full personalized pagerank matrix may be computed, e.g., via linear algebraic techniques, such as Power Iteration, or Monte Carlo, where the basic idea is to approximate Personalized PageRanks by directly simulating the corresponding random walks and then estimating the stationary distributions with the empirical distributions of the performed walks. The MapReduce algorithm may be used to compute the FPPR, which is based on the Monte Carlo approach. In general, single random walks of a given length starting at each node in the graph are efficiently computed, and then these random walks are used to efficiently compute the PPR vector for each node.

Augmentation-by-attribute has been described above, and includes Identifying the seed table, e.g., the seed tables for Q(K,A) are identified using the WIK index such that a web table T(K,B) is considered if A≈B. The direct mapping scores may be computed using Equation (3), and computing the tables TSP scores is described above. Aggregating and processing values may use the above-described "predict values" step; as set forth in the below algorithm:

---

Algorithm 1 Augment_ABA (Query table $Q(K, A)$)

1: $\forall\ q \in Q, \mathcal{P}_q = \{\ \}$
2: $\mathcal{R} = \text{WIK}(Q)$. {Relevant web tables.}
3: for all $T \in \mathcal{R}$ do
4:    for all $q \in Q$ and $t \in T$ s.t. $q[Q\ .K] = t[T.K]$ do
5:       $\mathcal{P}_q = \mathcal{P}_q \cup \{(\ v = t, [T.B]\ , S_T(v) = S(T)\ )\}$
6: for all $q \in Q$ do
7:    $\forall\ v \in \mathcal{P}_q, S(v) = \mathcal{J}(x_1, S_{T_i}(x_i)) \in \mathcal{P}_q | x_i = v\ S_{T_i}(x_i)$
8:    $\forall\ q \in Q\ , q[A] = q[Q.A] = \text{argmax}_v\ S(v)$

---

This online aggregation process may be distributed over many server machines each serving a partition of the indexes generated during preprocessing.

Augmentation-by-example (ABE) is a variation of the augmentation-by-attribute operation. Instead of providing the name of the augmenting attribute, the user provides the query table with some complete records as examples, i.e., for some of the keys, the values on the augmenting attribute are provided. The above-described steps to use the exemplified architecture may be identical to those of the augmentation-by-attribute operation, except for the way the seed tables are identified and the direct mapping scores calculated. Direct mapping considers a web table T to match the query table Q if and only if the records $Q_c$ overlaps with those in T. For example, in FIG. 4 the table 441 is considered a seed table for the query table 440 illustrated in FIG. 3B, because they overlap on the record (D3150, ABCDCo). Given the query table, the WIKV index is used to get the seed tables directly. In general, a web table T is assigned a high direct mapping score if, for each shared key between T and $Q_c$, the two tables agree on the augmenting attribute as well. Accordingly, direct mapping computes the matching score as:

$$S_{DMA}(T) = \frac{|Q^c \cap_{KV} T|}{|Q^c \cap_K T|} \qquad (7)$$

where $|Q^c \cap_{KV} T|$ is the number of overlapping records between the complete records of the query table Q and the web table T. The output matching score is between zero and one, where zero means for each shared key between $Q^c$ and T the tables do not agree on the augmenting attribute, and one means that for each shared key the corresponding records match on the augmenting attribute. Note also that this measure can be scaled further with $|Q^c \cap_{KV} T|$ to take into account the size of records' overlap as an additional evidence of direct matching. Individual records may be weighted using various techniques, such as inverse record frequency in the corpus, to increase the relative importance of two tables sharing a particular record.

Along with each imputed value, the service may return additional metadata about the returned value including a likelihood score and a subset of URLs identifying the source tables which were used to impute the value. This metadata may itself be aggregated over the values relevant to the query table. One example use of this metadata is to enable the task of finding the corpus tables most relevant to the user's query table. This operation may be thought of as performing a table search which returns a pointer to the underlying raw table(s) instead of the virtual, holistically aggregated table. This operation is useful for locating structured data in corpora gathered both from extranet as well as intranet sources. This operation also enables the user to view the raw data used to arrive at the imputed value; this allows the user to gain a deeper understanding into how the specific value was generated. The score metadata may be used by a user-interface to color-code predicted values based upon the level of confidence of the prediction. The user-interface may also choose to present the top-k imputed values for a given entity and attribute.

Another operation of the exemplified framework is to discover significant ("important") attributes for the query table with their synonyms (e.g., FIG. 3C). To this end, if given synonyms for each web table, clustering may be performed based on the notion of overlap among the synonyms, and used to make a distinction between the attributes and their synonyms. To discover synonyms for each web table, the same steps that were followed for the query table may be used. For a web table T(K,B), the process may identify the matching tables and assign each web table T'(K',B') a matching score with respect to T, S(T'). Then, each web table T' predicts B' as a synonym for B with the corresponding score S(T') and returns (B'; S(T')). This provides a set of predictions $P_T = \{(B_1, S(T_1)), (B_2, S(T_2)), \ldots \}$. The scores may be aggregated (similar to Equation (1)) and the top d (e.g., twenty) synonyms inserted into the synonyms index as synonyms of T, i.e., T2Syn(T).

The direct mapping approach identifies the matching tables in a first step. In this case, for a web table T, only the directly connected web tables to T are used in the SMW graph to provide synonyms. Note that for the table 441, direct mapping cannot report "Make" and "Vendor" as synonyms from the tables 445 and 446 because they are not directly connected to the table 441. Inaccurate clusters also may result from direct mapping.

If instead a holistic approach is used to get the matching tables, the table 445 and 446 are reachable from the table 441 and hence the PPR scores for 445 and 446 (i.e., $S_{Hol}(445)$, $S_{Hol}(446)$) with respect to the table 441 will be non-zero, and both the tables 445 and 446 contribute to the synonyms set of the table 441. Clustering the holistic synonyms typically provides two clusters (or synonym sets), e.g., one that represents the \Brand" attribute and the other one that represents the \Resolution" attribute, which is accurate and meaningful for camera domains.

The processing for the attribute discovery operation include identifying the seed tables, computing the TSP scores (as generally described above) and aggregation and processing of the values. Identifying the seed tables includes using the keys of the query table, such that DMA identifies the seed tables as those that overlap with the query table on the key attribute. Accordingly, direct mapping computes the matching score between Q and T as:

$$S_{DMA}(T) = \frac{|Q \cap_K T|}{\min\{|Q|, |T|\}} \qquad (8)$$

For example in FIG. 4 the table 441 is a seed table as it overlaps with the query table 440. Given the query table the WIK index provides the seed tables directly.

Aggregation and processing values are generally described in the following algorithm:

---
Algorithm 2 Attribute_Discover
(Query table $Q$, Web tables)

---
1: $\mathcal{R}$ = WIK($Q$) Relevant tables using the inverted index}
2: AllSynSet = { }
3: for all T $\in \mathcal{R}$ do
4:    AllSynSet = AllSynSet U (Syn(T), S(T))
5: return Cluster(AllSynSet)

---

For the attribute discovery operation, each web table T predicts a set of synonyms T2Syn(T) with the $S_{Hol}(T)$ score and returns (T2Syn(T), $S_{Hol}(T)$). After processing the matched tables, there is provided a set of synonym sets along with their corresponding prediction scores. The sets of synonyms are then clustered and the prediction scores are aggregated for each cluster. A sorted list of clusters is returned, in which each cluster represents a discovered attribute with its synonyms.

For the clustering, standard agglomerative clustering steps may be used, e.g., initially each synonym set T2Syn(T) is a cluster. The set of synonyms for a web table contains a weight of each term according to the aggregated scores, and therefore, cosine similarity may be used to compute the similarity between two clusters. Also, when two clusters are merged, their corresponding $S_{Hol}$ (or prediction) scores are aggregated to return a ranked list of clusters.

In the examples above, entity-attribute binary relations were used. This provides a simpler graph with a single score among the nodes, which enables modeling the problem as a TSP problem. With n-ary web tables and a single score among the nodes, a matching score between the query table and a web table will not say which column of the web table is the desired augmenting attribute. However, relational tables on the web are typically meant for human interpretation and usually have a subject column, and there are effective heuristics to identify a web table's subject, e.g., using the web search log where the subject column name has high search query hits, and also usually the subject column appears in the leftmost column. If the subject column can be identified, then such a table may be split into several entity-attribute binary relations, i.e., the subject column with each of the other columns comprise a set of entity-attribute binary relations. In general, the subject appears in a single column and multiple columns are not considered as subjects.

Figure 6:
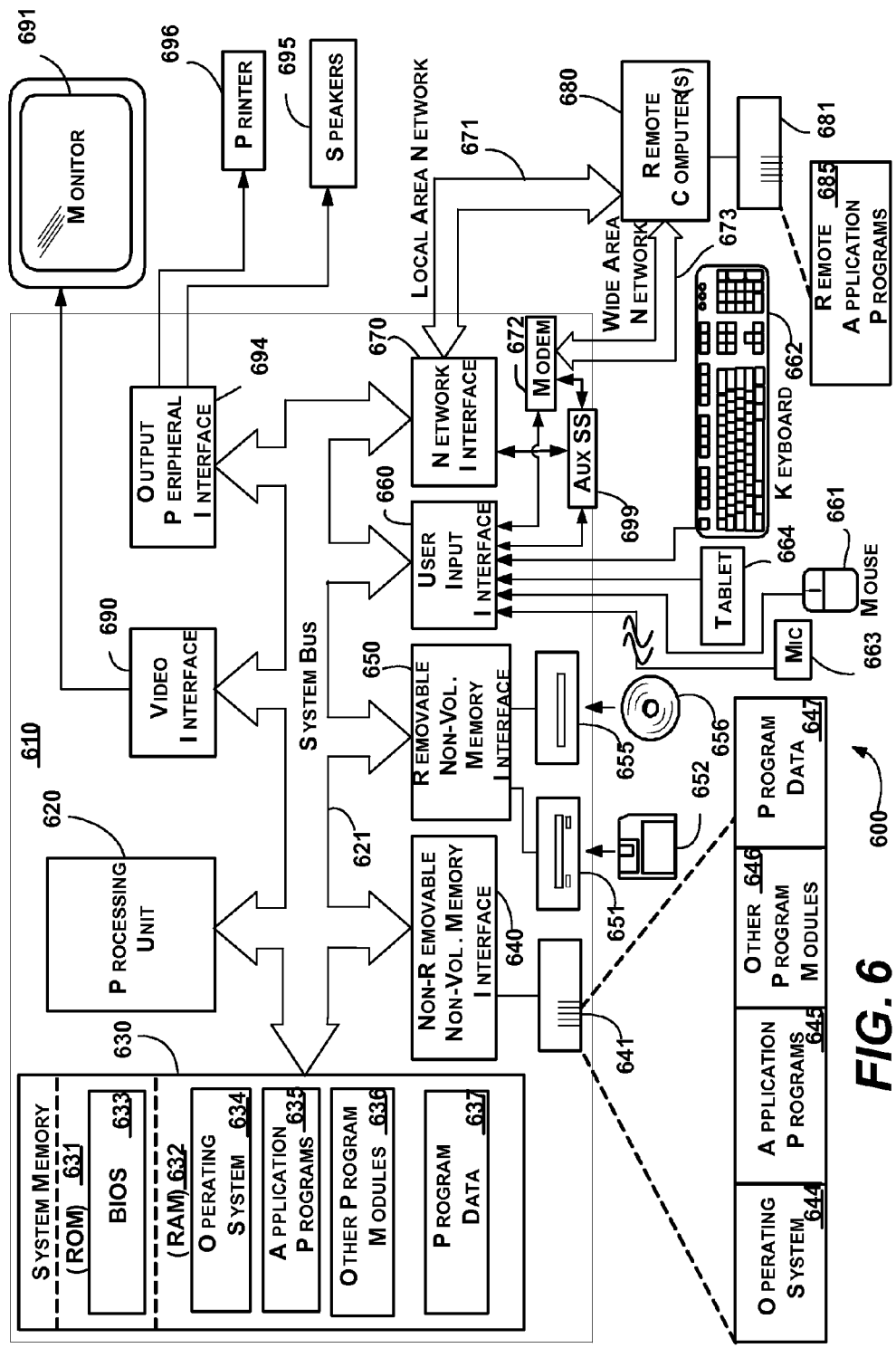
FIG. 6 is a block diagram representing an example non-limiting computing system or operating environment, e.g., in the example of a mobile phone device, in which one or more aspects of various embodiments described herein can be implemented.

FIG. 6 illustrates an example of a suitable computing and networking environment 600 into which the examples and implementations of any of FIGS. 1-6 may be implemented, for example. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the example operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an example system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are examples and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method performed at least in part on at least one processor for returning data to complete at least part of an augmentation task, comprising:
   receiving a query as input in the form of a query table including one or more entity names in a first query column and zero or more entity attributes in a second query column,
   accessing relationship-based data corresponding to relationships between a plurality of relational tables, the relationship-based data mined offline from at least one corpus and preprocessed offline into a plurality of indexes, and
   using the relationship-based data to:
      identify a direct relationship between the query table and a first relational table of the plurality of relational tables,
      identify an indirect relationship between the query table and a second relational table of the plurality of relational tables,
      identify a first score representing a first match between the query table and the first relational table,
      identify a second score representing a second match between the first relational table and the second relational table, and
      determine one or more entity attributes to return to augment the query table and complete the at least part of the augmentation task, the one or more entity attributes determined based at least partially on the first score and the second score.

2. The computer-implemented method of claim 1 wherein receiving a query comprises receiving a target header for the first query column or the second query column, and wherein accessing relationship-based data comprises identifying one or more relational tables including one or more data values associated with the target header, wherein the returned data represents one or more entity attributes for the second query column corresponding to the one or more entity names in the first column for which entity attributes are missing.

3. The computer-implemented method of claim 1 wherein using the relationship-based data comprises identifying one or more relational tables having a header that is a synonym of one of a first header for the first query column or a second header for the second query column.

4. The computer-implemented method of claim 1 wherein accessing relationship-based data comprises accessing an index, identifying a plurality of seed tables, and computing topic sensitive pagerank scores via a preference vector and a plurality of stored vectors for the seed tables.

5. The computer-implemented method of claim 1 wherein using the relationship-based data to find one or more entity attributes comprises aggregating and selecting a plurality of values from a plurality of final predictions.

6. The computer-implemented method of claim 1 further comprising,
   extracting the plurality of relational tables from the at least one corpus,
   processing the plurality of relational tables into a graph, and
   processing the plurality of relational tables into a plurality of vectors.

7. The computer-implemented method of claim 1 further comprising,
   extracting the plurality of relational tables from the at least one corpus, and
   processing the plurality of relational tables into a graph using holistic matching based on topic sensitive pagerank over the graph to provide the relationship-based data.

8. The computer-implemented method of claim 1 further comprising,
   extracting the plurality of relational tables from the corpus, and
   processing the plurality of relational tables into a graph using a model by using a feature set comprising one or more features corresponding to context associated with each relational table of the plurality of relational tables.

9. The computer-implemented method of claim 8 wherein processing the plurality of relational tables comprises,
   for at least one of the features, providing a representative document associated with a relational table of the plurality of relational tables, and
   computing a document similarity matrix from a plurality of documents.

10. The computer-implemented method of claim 8 further comprising, automatically generating labeled training data, and training the model based at least in part on the automatically generated labeled training data.

11. The computer-implemented method of claim 1 further comprising,
   extracting the plurality of relational tables from the corpus, and
   splitting at least one non-binary relational table into a plurality of binary tables based upon subject.

12. The computer-implemented method of claim 1 further comprising, extracting the plurality of relational tables from the corpus by classifying to separate the plurality of relational tables from other structured data, wherein the extracted plurality of relational tables include a plurality of true matching tables that match with each other and the first relational table.

13. The computer-implemented method of claim 1 further comprising, using a map-reduce architecture to extract one or more relational tables of the plurality of relational tables.

14. The computer-implemented method of claim 1, wherein receiving a query comprises receiving a first header for the first query column and receiving a second header for the second query column, and using the relationship-based data comprises identifying the first relational table that includes a first relational column with one or more data values correlating with the one or more entity names in the query table and a second relational column having a header correlating with the second header.

15. A system comprising:
   a memory coupled to a bus system, wherein the memory comprises computer useable program code; and
   one or more processing units, wherein the one or more processing units execute the computer useable program code to provide a service configured to process one or more domain-independent entity augmentation tasks corresponding to one or more queries, including to access a plurality of indexes preprocessed offline from a plurality of relational tables obtained from at least one corpus, and to respond to a query corresponding to an entity augmentation task with data obtained via the plurality of indexes, including to identify a plurality of seed tables via the index, compute a first score for a seed table of the plurality of seed tables based on direct mapping of a query table included in the query with the seed table, compute a second score for the seed table based on indirect mapping of a relational table with the seed table, aggregate the first and second scores, and return a final prediction based at least partially upon the aggregation of the first and second scores to complete an entity augmentation task to respond to the query, the seed tables representing tables that have complete records in common with the query table.

16. The system of claim 15 wherein the service is further configured to process a request for synonyms by accessing a synonym-related index built from the plurality of relational tables, including based upon the indirect mappings.

17. The system of claim 15 wherein the vectors of each seed table correspond to a plurality of personal page rank vectors.

18. The system of claim 15 wherein the indirect mappings are based upon topic sensitive pagerank over a graph built from the plurality of seed tables.

19. One or more computer memory storage devices having computer-executable instructions, which when executed perform steps, comprising:
   in an offline operation before receiving an entity augmentation query corresponding to an entity augmentation task, preprocessing entity attribute relation tables extracted from a corpus into a plurality of indexes used for entity augmentation, including performing holistic matching between the entity attribute relation tables that includes computing values for direct relationships and indirect relationships between at least some of the tables, the indirect relationships determined based upon one or more entity attribute relation tables that have a direct relationship with a query entity; and accessing the plurality of indexes to process the entity augmentation task by identifying a direct relationship between the query entity and a first entity attribute relation table, and an indirect relationship between the first entity attribute relation table and a second entity attribute relation table, identify a first score representing a first match between the query entity and the first entity attribute relation table, and a second score representing a second match between the first entity attribute relation table and the second entity attribute relation table, and determine one or more entity attributes to complete the entity augmentation task, the one or more entity attributes determined based at least partially on the first score and the second score.

20. The one or more memory storage devices of claim 19 wherein performing the holistic matching includes using context associated with at least two of the entity attribute relation tables, wherein the entity augmentation task is processed based on a comparison of the computed values with a user-specified threshold value.

21. The one or more memory storage devices of claim 19 having further computer-executable instructions comprising, receiving the entity augmentation query, the entity augmentation query identifying one or more of an entity set, an attribute name, or an attribute example.

* * * * *